United States Patent [19]

Richards

[11] Patent Number: 5,060,598

[45] Date of Patent: Oct. 29, 1991

[54] CAT LITTER

[76] Inventor: Jeffrey C. Richards, 3635 James Ave., Deephaven, Minn. 55391

[21] Appl. No.: 510,092

[22] Filed: Apr. 17, 1990

[51] Int. Cl.$^5$ ............................................. A01K 45/00
[52] U.S. Cl. ................................................. 119/171
[58] Field of Search ........................... 119/1, 172, 161

[56] References Cited

U.S. PATENT DOCUMENTS

| | | | |
|---|---|---|---|
| 3,980,050 | 9/1976 | Neubauer | 119/1 |
| 4,258,659 | 3/1981 | Rowell | 119/1 |
| 4,341,180 | 7/1982 | Cortigene et al. | 119/1 |
| 4,402,941 | 9/1983 | Vaillancourt | 424/153 |
| 4,560,527 | 12/1985 | Harke et al. | 264/500 |
| 4,570,573 | 2/1986 | Lohman | 119/1 |
| 4,618,496 | 10/1986 | Brasseur | 119/1 X |
| 4,621,011 | 11/1986 | Fleischer et al. | 119/1 X |
| 4,676,196 | 6/1987 | Lojek et al. | 119/1 |
| 4,721,059 | 1/1988 | Lowe et al. | 119/1 |
| 4,723,509 | 2/1988 | Schaefer | 119/1 |
| 4,788,936 | 12/1988 | Billings | 119/1 |
| 4,794,022 | 12/1988 | Johnson et al. | 119/1 X |
| 4,827,871 | 5/1989 | Morrison | 119/1 |

Primary Examiner—Gene Mancene
Assistant Examiner—R. Thomas Price
Attorney, Agent, or Firm—Kinney & Lange

[57] ABSTRACT

A cat litter is provided which is formed from a selective quantity of peat so that the peat absorbs urine such that the release of ammonia is substantially inhibited. A method of producing a cat litter also is provided.

6 Claims, No Drawings

CAT LITTER

BACKGROUND OF THE INVENTION

The present invention relates to cat litter and to the method of producing the cat litter.

Cat litter for a cat litter box is well known and is considered a valuable household commodity known to a vast majority of cat owners. The cat litter used in the cat's litter box serves to absorb urine and other excrements, and eliminate odors. Previous cat litters have been formed of naturally occurring absorbent materials such as clay and alfalfa. Other materials which are used as cat litter included wood chips, sawdust, sand, peanut shells, rice hulls, pelletized grass, grain fibers and shredded paper or cardboard. The problems with these materials are low absorbency and lack of odor control.

The Lowe et al. U.S. Pat. No. 4,721,059 describes a clay-like filler material for a cat litter box formed from treated paper sludge and a method of treating the sludge to form the filler which includes the physical properties of clay fillers. The method involves adding materials to the shredded slurry to control color, bacteria, fungi, absorbency, pests, and fragrance. The slurry is then formed into granules and dried prior to being packaged.

SUMMARY OF THE INVENTION

A cat litter is provided which is formed from a selected quantity of peat such that the peat absorbs urine. By absorbing the urine, the release of ammonia odors associated with urine is substantially inhibited.

A method of producing a cat litter also is provided. The method involves draining free water from the peat, air drying the peat until the peat has a moisture content of approximately 40% to 60% by weight and rotary drying the peat until the peat has a moisture content of approximately 6% to 16% by weight. The peat is then screened through a #4 sieve and further screened to produce a processed peat material whereby approximately 90% of the material passes through a #6 sieve, approximately 78% of the material passes through a #10 sieve, approximately 74% of the material passes through a #12 sieve, approximately 64% of the material passes through a #18 sieve and approximately 14% of the material passes through a #40 sieve. A soybean oil substance is preferably mixed with the peat to reduce dust and tracking.

DETAILED DESCRIPTION OF THE PREFERRED EMBODIMENTS

An understanding of the cat litter of the present invention may be obtained by following the procedure disclosed below. The primary material utilized in the process of the present invention is peat. Peat is defined in *The American Heritage Dictionary*, 2d College Edition, as a "partially carbonized vegetable matter, usually mosses, found in bogs, and used as fertilizer and fuel. Basically, peat is an organic matter in varying stages of decomposition which accumulates over a period of time in water-saturated conditions.

The peat is produced in an environment that includes many different interactions among plants, water, topography and climate. In wetland-type communities, the lack of oxygen in a water-saturated environment limits activity of microorganisms that digest dead plant material. Thus, in a peat producing environment, the plant material, which would ordinarily decompose in a less water-saturated environment, accumulates faster than the plant material decomposes. The partially decomposed material is called peat.

The International Peat Society in 1976 classified peat into four different types, namely, moss peat, herbaceous peat, wood peat, and a mixture of the preceding groups. Moss peat is composed mainly of plant remains derived from sphagnum and other mosses. Herbaceous peat is composed mainly of plant remains derived from sedges, reeds, grass and related species. Wood peat is composed of plant remains from trees and shrubs. For cat litter for use in a cat litter box any of the four different types of peat may be used.

In producing the cat litter, peat is provided in a selected quantity such that urine from an animal is absorbed. Basically, urine contains water, salt and urea. The ammonia smell of urea is the odor that most available cat litters seek to mask, neutralize or otherwise suppress. Ammonia is given off as a gas whenever urine starts to chemically decompose, as it does shortly after discharge from all animals and humans. It is believed that the peat absorbs the urea such that the urea does not chemically decompose at room temperature and pressure and, thus, emit urea ammonia odors. Consequently, the odor of urine is substantially inhibited, not by using perfumes or masking agents, but by using peat.

After providing a selected quantity of peat, the peat is preferably dewatered and otherwise drained. Any conventional dewatering or draining method may be used including pressing, centrifuging, or the like. The peat is then air dried until the peat has a moisture content of approximately 40% to 60% by weight. The next step is to rotary dry the peat until the peat has a moisture content of approximately 6% to 16% by weight. The drying is accomplished in any standard dryer such as a fluid bed dryer, turbo dryer, belt dryer, tray dryer, or the like.

After the peat has been dried, the peat is preferably screened through a #4 sieve. Next, the peat is further screened to produce a processed peat material whereby approximately 90% of the material passes through a #6 sieve, approximately 78% of the material passes through a #10 sieve, approximately 74% of the material passes through a #12 sieve, approximately 64% of the material passes through a #18 sieve and approximately 14% of the material passes through a #40 sieve. The processed peat material is then capable of being packaged and sold as a cat litter or similar product.

In order to control dust and tracking of the processed peat material, a soybean oil substance is preferably mixed with the peat. The soybean oil substance comprises approximately 4% of the peat by weight.

The following tests were conducted to determine the odor and water absorption capabilities of the processed peat material of the present invention as opposed to other cat litters which are on the market:

ODOR ABSORPTION TEST

The odor absorption test involved the use a Dragor Gas Detector Pump instrument using Ammonia 5/a tubes. Parson's Sudry Ammonia (all-purpose cleaner) was used to create the ammonia odor similar to cat urine smell. Approximately 4000 ml of processed peat material and three other types of cat litter were spread about separate cat litter boxes with the dimensions of sixteen inches × twelve inches × five inches. The other cat litters were "Control" manufactured by Clorox Company, Oakland, California 94612, "Cat's Pride Premium Cat Litter" by Oil-Dri Corporation of America, Chicago, Ill. 60611, and "Kitty Litter" by Edward Lowell Industries, South Bend, Ind. 46601. The cat litters listed above are all believed to be clay based. None of the above listed cat litters contains peat.

Next, approximately 250 ml of ammonia was poured into the processed peat material and each of the other cat litters, distributing the ammonia substantially equally about each litter box.

The test area was a room approximately ten feet × seventeen feet × nine feet. The ventilation in the room was closed such that the room was air-tight. After each test, the room was ventilated for approximately ten minutes.

In conducting the test, the Dragor pump was held over each cat litter box at a height of four feet while being pumped. Readings were taken immediately after the ammonia was placed in each litter box, in addition to five and ten minute intervals.

The results were as follows:

| Peat Cat Litter of the Present Invention: | |
| --- | --- |
| Immediately | 0 ppm |
| Five minutes | 3 ppm |
| Ten minutes | 2 ppm |
| With additional 250 ml of ammonia: | |
| Five minutes | 3 ppm |
| Control: | |
| Immediately | 2 ppm |
| Five minutes | 4 ppm |
| Ten minutes | 5 ppm |
| Cat's Pride: | |
| Immediately | 0 ppm |
| Five minutes | 3 ppm |
| Ten minutes | 2 ppm |
| Kitty Litter: | |
| Immediately | 5 ppm |
| Five minutes | 7 ppm |
| Ten minutes | 10 ppm |

By comparing the results of the odor absorption test between the peat cat litter of the present invention and Control, Cat's Pride and Kitty Litter, the peat cat litter has the capability to absorb ammonia in equal or greater quantities to other cat litters. It is evident from the above results that the peat cat litter continues to absorb odors even as significantly more ammonia is added to the existing peat quantity.

WATER ABSORPTION TEST

The water absorption test compares the quantity of water different types of cat litters absorb compared to the peat cat litter of the present invention. Approximately 1000 ml of water was mixed with approximately 1000 ml of the cat litter and was allowed to set for 30 minutes. The mixture of water and cat litter was poured through a colander measuring eight inches in diameter with a #12 sieve. After 30 minutes had elapsed, the cat litter was weighed and the amount of water absorbed was determined.

Peat Cat Litter of Present Invention
Absorbed 500 grams of water
After 24 hours: absorbed 807 grams of water
Control:
Absorbed 598 grams of water
Cat's Pride:
Absorbed 541 grams of water
Kitty Litter:
Absorbed 415 grams of water.

By comparing the results of the water absorption test, the peat cat litter of the present invention has the capability to absorb water equal to the other cat litters, Control, Cat's Pride and Kitty Litter. Over the long term, the peat cat litter of the present invention continues to absorb liquids.

As mentioned previously, peat is a naturally occurring, organic substance. The disposal of the processed peat material after use as a cat litter is beneficial to the environment. The used material can be used in gardens and on lawns as an organic fertilizer. The material may also be composted or burned as a fuel.

Other uses of the processed peat material include using the processed peat material as a filler material in gerbil cages, hamster cages, mice cages, or the like. In addition, the processed peat material is useful as a filler material in portable toilets and outhouses since the processed peat material is capable of reducing the urea ammonia odor associated with human urine as found in portable toilets and outhouses used by humans.

Although the present invention has been described with reference to preferred embodiments, workers skilled in the art will recognize that changes may be made in form and detail without departing from the spirit and scope of the invention.

What is claimed is:

1. A method of producing a filler material, the method comprising the steps of:
   processing a selected quantity of peat so that the peat absorbs urine such that release of ammonia is substantially inhibited;
   draining free water from the peat;
   air drying the peat until the peat has a moisture content of approximately 40% to 60% by weight; and
   rotary drying the peat until the peat has a moisture content of approximately 6% to 16% by weight.

2. The method of claim 1 and further including the steps of:
   screening the peat through a #4 sieve; and
   further screening the peat thereby producing a processed peat material whereby approximately 90% of the material passes through a #6 sieve, approximately 78% of the material passes through #10 sieve, approximately 74% of the material passes through a #12 sieve, approximately 64% of the material passes through a #18 sieve and approximately 14% of the material passes through a #40 sieve.

3. The method of claim 1 and further including the step of:
   mixing a soybean oil substance with the peat.

4. The method of claim 3 wherein the soybean oil substance comprises approximately 4% of the peat by weight.

5. A filler material for use in a cat litter box, the filler material comprising:
   a selected quantity of peat so that the peat absorbs urine such that the release of ammonia is substantially inhibited; and
   wherein the peat has a moisture content of approximately 6% to 16% by weight.

6. A filler material of claim 5 wherein the peat includes a soybean oil substance, the soybean oil substance comprising approximately 4% of the peat by weight.

* * * * *